Sept. 4, 1934.  G. W. HEISE  1,972,775
NONSPILLABLE PRIMARY BATTERY WITH LIQUID ELECTROLYTE
Filed June 28, 1929
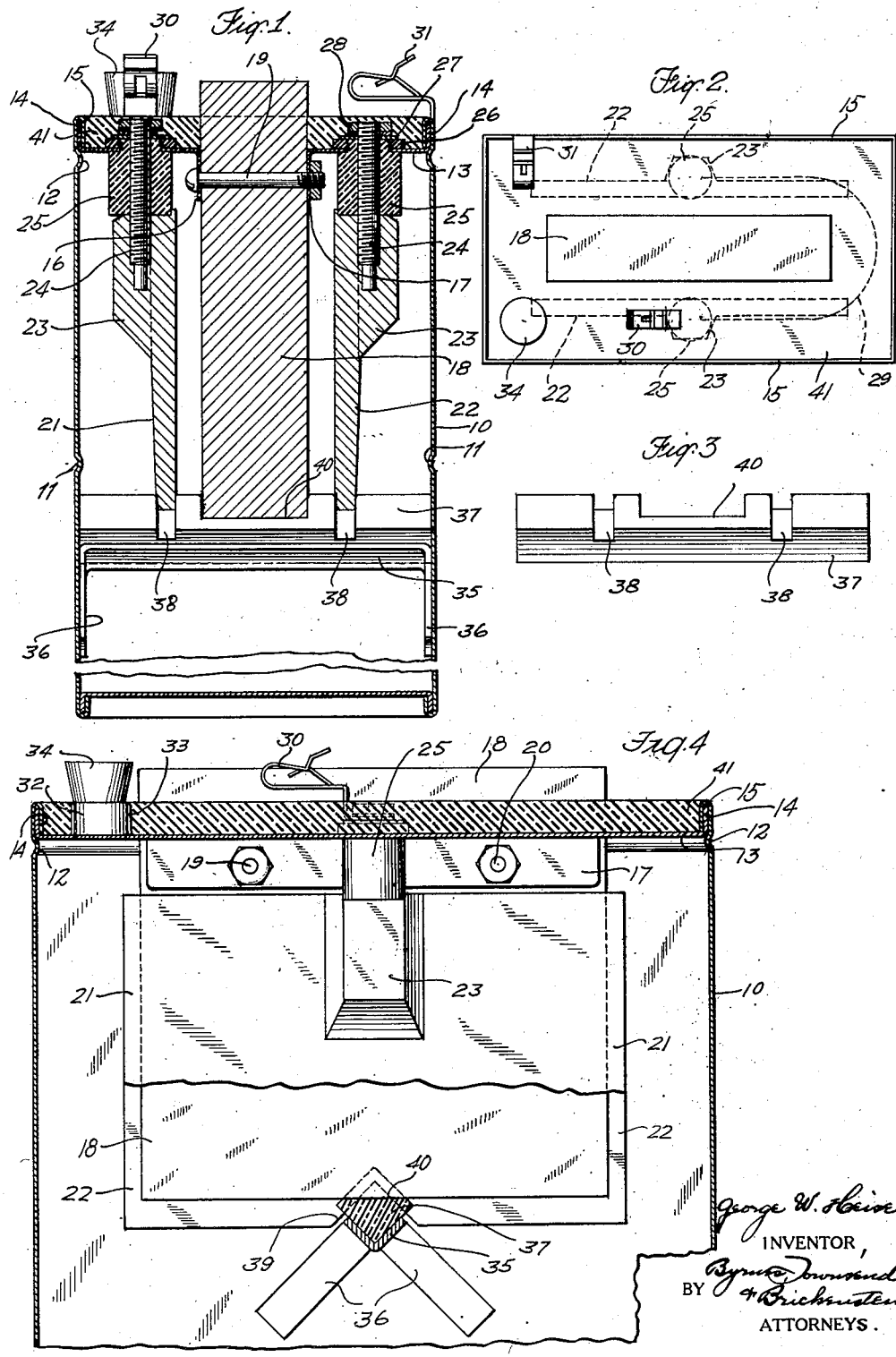

Patented Sept. 4, 1934

1,972,775

UNITED STATES PATENT OFFICE 1,972,775

NONSPILLABLE PRIMARY BATTERY WITH LIQUID ELECTROLYTE

George W. Heise, Lakewood, Ohio, assignor to National Carbon Company Inc., a corporation of New York Application June 28, 1929, Serial No. 374,519

6 Claims. (Cl. 136—86)

This invention pertains to air depolarized battery cells and more specificially to means for sealing a fluid electrolyte in such a cell and for admitting depolarizing air through the seal.

Heretofore the fluid electrolyte of an air-depolarized battery cell has suffered such disadvantages as spillage, deterioration through absorption of atmospheric carbon dioxide, and evaporation, all of which made the cell less desirable. In certain types of wet cells, oil may be placed on the surface of the electrolyte to prevent evaporation and access of carbon dioxide, but this is not immediately feasible in air-depolarized cells, since the cathode which protrudes above the electrolyte surface soon becomes filled with oil, the entry of depolarizing air is prevented, and cell operation is seriously impaired. For cells which are not to be moved about, some protection can be secured by mechanical means, but these complicate construction and usually become inoperative in case of spillage or upset; hence they are of little value in portable cells. Means have been employed for automatically replacing the evaporated electrolyte but this is undesirable as it complicates the cell which still requires comparatively frequent attention and, with all these expedients, the electrolyte is still subject to spillage.

Therefore, one object of this invention is to provide means for sealing a fluid electrolyte in an air depolarized battery cell and for admitting depolarizing air to said battery cell through said seal without letting the electrolyte out. Another object is to provide an air depolarized battery cell that may be manufactured and shipped in a dry condition and then activated by the addition of water at the time it is placed in service. Another object is to provide an air depolarized battery cell of more rigid construction in which the elements thereof are supported at both the top and bottom so the battery may be shipped in assembled condition without danger of its being broken or damaged during transportation. Still other aims, objects, and novel features will be apparent from the following description and the accompanying illustration in which:

Fig. 1 is a transverse vertical section of my improved battery cell;

Fig. 2 is a view of the top of the same showing the position of the electrical conductor connecting the two anodes;

Fig. 3 is a side view of the insulator that supports the lower end of the battery elements, and;

Fig. 4 is a side view of my improved battery cell with part of the container and one of the anodes broken away to show the interfitting relation between the insulator and the battery elements.

One embodiment of the present invention may be that shown in the accompanying drawing which comprises a container 10 of iron that may be provided with one or more stiffening beads 11 formed in the sides thereof, and an inturned cover supporting bead 12 extending therearound near the top. Fitting snugly within the upper end of the container 10 is a sheet iron cover 13 resting on the inturned bead 12 and having its edge 14 turned upward and held by the crimped edge 15 of the container 10. This method of attachment holds the cover securely in the top of the container and at the same time the top of the container is stiffened and a recess is provided therein for a purpose that will be described presently.

A rectangular opening is provided in the center of the cover 13 and the metal removed therefrom is divided and bent downward along each side of the opening thereby forming opposed ears 16 and 17. A cathode 18 is secured in said opening by two bolts 19 and 20 that pass through said cathode and said ears 16 and 17 thereby clamping them to the cathode 18. The cathode 18 extends downward into the container far enough to dip the required distance into an electrolyte that will be described later, and upward through said cover a short distance into the outer air.

The cathode 18 is carbon or a carbonaceous material, and a binder, molded into blocks of suitable size and shape. These blocks are waterproofed by impregnation with a solution of paraffin and carbon tetrachloride, and the solvent is removed by heat. The cathode may be prepared in ways other than the above and oil may be used in place of the paraffin for the purpose of waterproofing.

The container 10 and the carbon electrode 18 are electrically connected. The terminal 31 is connected to the iron container for purposes of convenience. Although there is a closed path through the electrolyte between the carbon electrode and the iron container so that an electric current flows therebetween in case they are at different electrical potentials, this difference in potential is so small the current is negligible. This electrical connection between the carbon electrode and the iron container is customary in cells of this type. Cells of this type should be distinguished from dry cells in which the outer container is of zinc and forms one of the electrodes and any electrical connections between the outer container and the carbon electrode short-circuits the cell. In the cell described herein this is not the case. The electrical potential is between the zinc electrodes 21, 22 and either the carbon electrode 18 or the container 10. However the current between the zinc electrode and the iron container is believed to be very small on account of polarization of the latter. The main current is between the zinc and carbon electrodes and the current generated by the cell normally flows between the zinc and carbon electrodes within the cell and between terminals 31 and 30 outside of the cell.

Two anodes 21 and 22, which are identical, are positioned in the container 10 so that one is on each side of the cathode 18. These anodes are cast of zinc containing about 1% of mercury. To prevent undue reduction in effective area during cell discharge they are preferably thicker at the top than at the bottom. Also, they are slightly wider than the cathode 18 so they extend past it a short distance, and they are positioned in the container 10 so they extend downward a short distance below the bottom of the cathode.

Each of the anodes 21 and 22 is provided with a boss 23 at the center of the upper edge in which a suspension bolt 24 is either threaded or cast so it extends upward. These suspension bolts may be iron, copper plated and amalgamated according to the usual practice in battery cells of this type. Surrounding each suspension bolt 24 above its associated anode is an insulator 25 of rubber or porcelain having a shoulder on the upper end fitting in an opening in the cover 13 through which the bolt 24 extends upward. A nut 28 on the upper end of each suspension bolt 24 clamps an iron washer 27 and a rubber gasket 26 to the upper side of the cover 13 thereby rigidly securing each of the anodes 21 and 22 to the cover 13. An electrical conductor 29, such as an insulated copper wire, is also secured under each of the nuts 28 for the purpose of electrically connecting the anodes 21 and 22, and a suitable wire connector such as a spring clip 30 is also secured under one of the nuts 28, and another spring clip 31 is attached to the top of the container 10 by any suitable method such as soldering or welding to provide convenient means for connecting conductors to the two electrical poles of the battery cell.

An opening 32 is formed in the cover 13 to provide means for filling the cell with electrolyte, and the edge 33 of the opening 32 is turned upward to provide a stable support for a removable closure plug or cork 34.

Extending across the container 10 just below the battery elements 18, 21 and 22, is a trough shaped, sheet iron support and brace 35 having two attaching members 36 turned downward at an angle from each end and secured to the inner wall of the container 10 by any suitable method such as spot or fusion welding thereby rigidly securing the support 35 to the container 10. Resting in the trough shaped support 35 with one of its corners uppermost is a square insulator 37 of any suitable material such as hard rubber or porcelain of sufficient length to extend across the container 10 so one of its ends rests against each of the side walls which prevent the insulator from shifting endwise in the support 35.

Extending across the two upper sides of the square insulators 37 a flat bottomed groove 38 is provided, and on the under side of each of the anodes 21 and 22 a V shaped notch 39 is provided. The width of each of the grooves 38 is substantially that of one of the anodes 21 and 22, and the shape of the bottom of each of the grooves 38 is substantially that of the bottom of each of the notches 39. The insulator 37 is positioned in the container 10 so the bottom of one of the notches 39 is substantially in contact with the bottom of one of the grooves 38 and, consequently, a portion of the insulator 37 extends or fits into each of the notches 39 of the anodes 21 and 22, and a portion of each of the anodes 21 and 22 extends or fits into one of the grooves 38 of the insulator 37. By this unique arrangement of the interfitting portions of the anodes 21 and 22 and the insulator 37, the anodes are rigidly supported at the bottom thereof and also restrained from movement with relation to the container 10 and cathode 18. Between the grooves 38 of the insulator 37 a horizontal slot 40 is provided into which the lower end of the cathode projects and by which the cathode is protected from lateral strains and is also restrained from lateral movement. By supporting the anode and cathode elements of the battery at the bottom a structure is secured that is sufficiently rigid to permit shipping the battery cells in completely assembled condition without their becoming damaged during transportation.

The mechanical construction of the battery cell is completed by filling the top of the container 10 above the cover 13 with a sealing compound 41 of pitch or other suitable material. The sealing compound 41 closes all openings that may remain between the container 10 and the cover 13, and between the cover 13 and the cathode 18. The nuts and washers on the upper end of the suspension bolts 24 are completely covered by the sealing material thereby closing all joints between them and the cover, as well as preventing their movement or displacement. The conductor 29 is also covered and imbedded in the compound thereby insulating it from electrical contact. The upper end of the cathode 18 is not covered by the sealing compound 41 but instead it projects upward therethrough to the outer air thereby providing access for the oxygen required for depolarization.

The battery cell may be filled with any suitable electrolyte such as a 20% solution of caustic soda and then moved or transported without danger of leakage or spillage. Preferably, a hydrated caustic soda such as that described in U. S. patent application bearing Serial Number 281,459 (now Patent No. 1,863,791, granted June 21, 1932) is placed in the cell in solid form at the time of manufacture, and then water is added at the time the cell is placed in use and the solution stirred in the manner disclosed in U. S. patent application bearing Serial Number 282,315 (now Patent No. 1,815,508, granted July 21, 1931). This prevents all deterioration of the unused cell.

While it is intended that the cell will be used in an upright position it may, nevertheless, be tipped over or even turned upside down without spilling the electrolyte.

When in use air enters through the exposed portion of the cathode and provides the oxygen required for depolarization but, as the cathode is substantially waterproof, this exposed portion remains dry and the evaporation of electrolyte therethrough if any is of such a small amount that it in no way interferes with the operation of the cell or the length of its normal life.

It is understood, of course, that various changes, alterations, and substitutions, may be made in the battery cell without departing from the invention or sacrificing any of the rights thereunder.

I claim:

1. An air depolarized battery cell comprising a container; a metallic cover having upturned edges secured to the top of said container; a fluid electrolyte in said container; an anode secured to said cover but electrically insulated therefrom and extending downward into said electrolyte; a cathode mechanically and electrically connected to said cover and extending both downward into said electrolyte and upward through said cover into the outer air; and a material filling said cover and sealing said container against the spillage of said electrolyte.

2. An air depolarized battery cell comprising a container; a metallic cover set into the top of said container; a fluid electrolyte in said container; a seal in the top of said container to prevent the spillage of said electrolyte; an anode secured to said cover and extending downward into said electrolyte; opposed ears bent downward from said cover thereby leaving an opening therein; a cathode secured to said ears and extending both downward into said electrolyte and upward through said opening and said seal into the outer air.

3. An air depolarized battery cell comprising a container; a fluid electrolyte in said container; a cover set in the top of said container; sealing means in the top of said container to prevent the spillage of said electrolyte; an anode in contact with said electrolyte and secured to said cover; a cathode in contact with said electrolyte and secured to said cover through which it extends to the outer air; an opening through said cover and seal for adding fluid to said electrolyte; and a removable closure for said opening.

4. An air depolarized battery cell comprising a container; the dry ingredients of a fluid electrolyte within said container; a cover for said container; means for sealing said cover to said container to prevent spillage of fluid from said battery cell; an anode within said container and secured to said cover; a cathode within said container and secured to said cover through which it projects upward to the outer air; means for attaching conductors to said anode and said cathode; an opening through said cover and seal for filling said container with fluid to activate said cell, and a removable closure for said opening.

5. An air depolarized battery cell comprising a container having internal beads near the upper edge thereof; a cover for said container fitting in the top thereof and resting on said beads; a fluid electrolyte in said container; sealing means filling the top of said container above said cover to prevent the spillage of said electrolyte; an anode within said container and secured to said cover by means partially imbedded in said sealing means; a cathode within said container and secured to said cover through which it extends upward through said sealing means to the outer air; means for adding fluid to said electrolyte and means for connecting electric conductors to said anode and said cathode.

6. An air depolarized battery cell comprising a container; the dry ingredients of a fluid electrolyte within said container; a cover set in the top of said container; sealing means in the top of said container to prevent spillage of fluid from said battery cell; an anode within said container; a cathode within said container and secured to said cover through which it extends to the outer air; an opening through said cover and seal for filling said container with fluid to activate said cell; and a removable closure for said opening.

GEORGE W. HEISE.